Feb. 22, 1966     W. E. THIERMANN     3,236,398
APPARATUS FOR POLE SETTING
Filed Oct. 7, 1963                          2 Sheets-Sheet 1
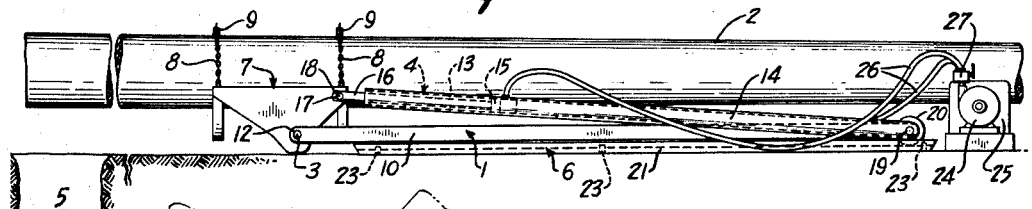
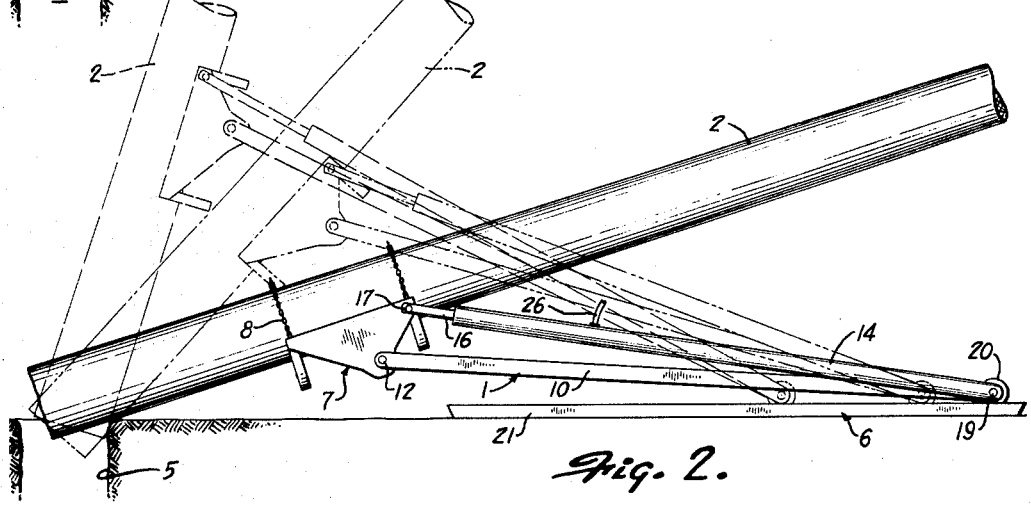
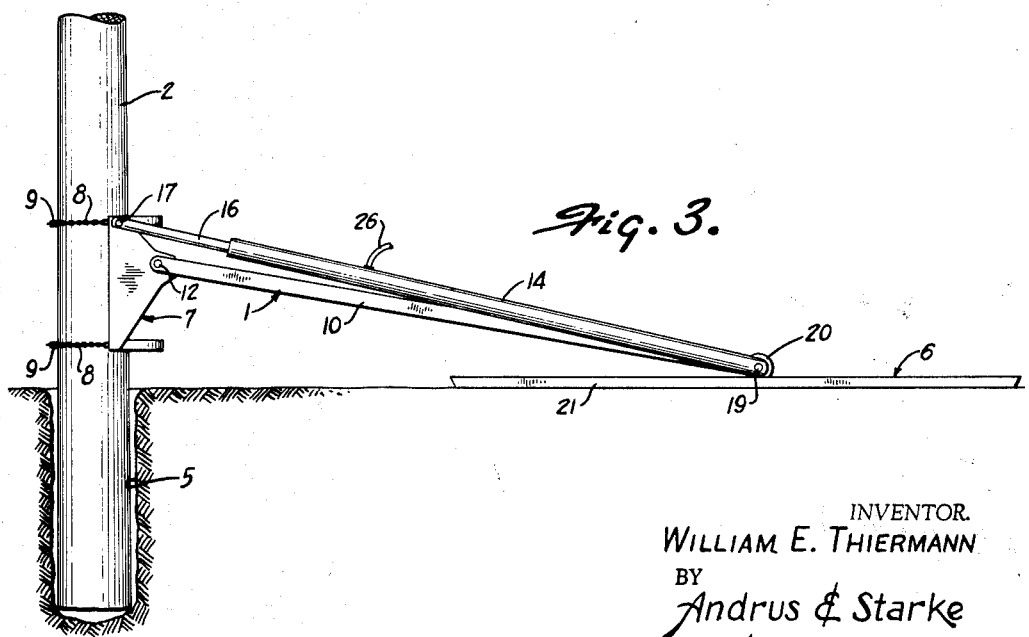
INVENTOR.
WILLIAM E. THIERMANN
BY
Andrus & Starke
ATTORNEYS Feb. 22, 1966     W. E. THIERMANN     3,236,398
APPARATUS FOR POLE SETTING
Filed Oct. 7, 1963     2 Sheets-Sheet 2
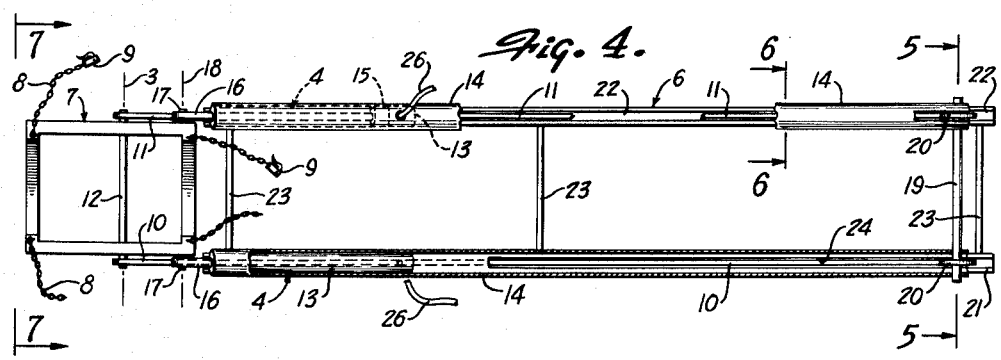
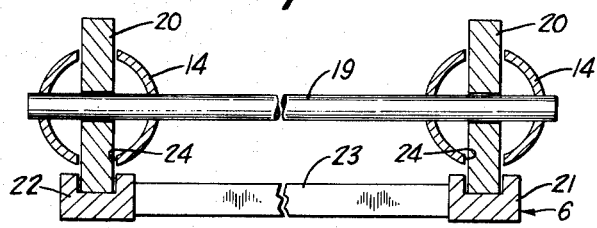
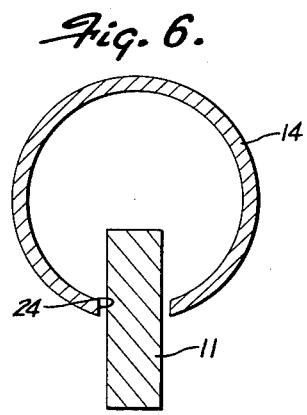
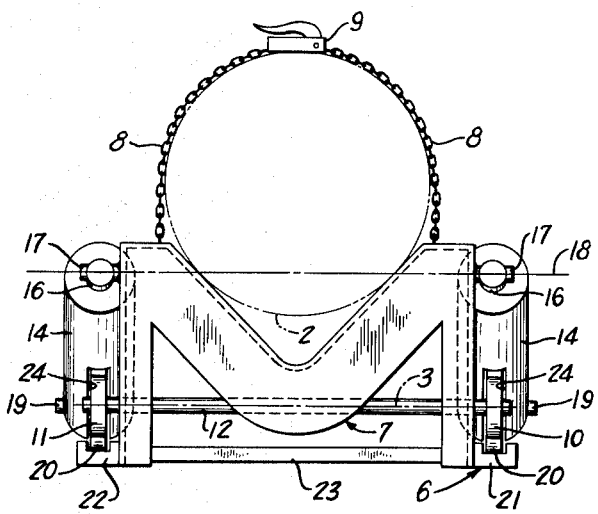
INVENTOR.
WILLIAM E. THIERMANN
BY
Andrus & Starke
ATTORNEYS

United States Patent Office 3,236,398
Patented Feb. 22, 1966

3,236,398
APPARATUS FOR POLE SETTING
William E. Thiermann, 10726 N. Wauwatosa Road,
76–W, Mequon, Wis.
Filed Oct. 7, 1963, Ser. No. 314,201
3 Claims. (Cl. 214—3)

This invention relates to a method and apparatus for pole setting.

This application is a continuation in part of application Serial No. 61,968, filed October 11, 1960 by the present inventor and copending herewith, which application has issued to Patent No. 3,112,037 during the pendency of this application.

In the setting of poles for utilities in positions where large truck or tractor mounted power equipment is not available, the problem of raising the pole and setting it into the hole becomes difficult.

The present invention employs a hydraulic jack of simple construction and tilts the pole upwardly with its butt end engaged in the hole, from an initial substantially horizontal position to a vertical position where the butt end of the pole drops into the hole.

In carrying out the method the pole itself becomes a part of the leverage system in raising the pole, as distinguished from previous methods of bodily lifting the pole and then dropping it into the hole. A simple lever arm is in effect pivoted to the pole at an intermediate point and hydraulic or other suitable power means effects relative pivotal movement between the pole and the arm. The free end of the arm is supported on the ground and the butt end of the pole engages in the top of the hole so that the pivot between the pole and arm lifts upwardly and the free end of the arm moves inwardly along the ground toward the pole during raising of the latter to a vertical position.

In carrying out the method the pole and arm constitute a toggle-like lever system with the butt end of the pole and the arm constituting the only support for the pole in raising it.

Several forms of apparatus may be employed such as the apparatus described and claimed in the above identified application or the simpler apparatus of the present invention.

The invention has important application to the raising of poles in lawn areas where it is desired to avoid injury to a lawn, and in areas which may not be accessible to other types of pole setters.

The accompanying drawings illustrate the best mode presently contemplated by the inventor for carrying out the invention.

In the drawings:

FIGURE 1 is a side elevation of a pole and apparatus secured thereto and lying on the ground ready for raising of the pole;

FIG. 2 is a similar view showing the raising of the pole in an initial stage and with successive stages of pole raising shown in broken lines;

FIG. 3 is a similar view showing the pole after it is dropped in the hole.

FIG. 4 is a top plan view of the apparatus as in the position of FIG. 1;

FIG. 5 is a detail transverse vertical section taken on line 5—5 of FIG. 4;

FIG. 6 is a detail transverse vertical section taken on line 6—6 of FIG. 4; and

FIG. 7 is a front end elevation taken on line 7—7 of FIG. 4 showing the cradle and with the pole in phantom.

The method illustrated in FIGS. 1 to 3, inclusive, comprises the use of a brace or support arm 1, which may be in the form illustrated or in various forms such as that shown in the above identified copending application, and which is suitably pivoted to the pole 2 on a transverse horizontal pivot axis 3. The pivotal connection between the arm 1 and pole 2 should be located at a distance from the butt end of the pole at least as great as the depth of the hole into which the pole is to be set. The arm 1 should extend from the pivot in a direction generally opposite, i.e. away from the butt end of the pole.

By exerting a force across the pivot axis 3 between the arm 1 and pole 2 by suitable means such as the hydraulic motor 4 the angular relation of the pole and arm is changed to effect upward tilting of the pole on its butt end and upward tilting of the arm on its free end. Continued progressive tilting action will raise the pole to nearly vertical position where the butt end freely drops into the hole 5.

During raising of the pole the free end of the arm 1 moves inwardly toward the hole 5, and the arm continually supports the free end of the pole in its upward tilting action. For this purpose and in order to avoid injury to a lawn or other terrain, the free end of the arm 1 may be supported by a lawn protective means such as the wheels illustrated in said copending application or a plank or channel slide track 6 as illustrated in the present application.

The apparatus herein illustrated is of a simpler construction as compared to that of the copending application. It provides an effective pivot between the arm 1 and the ground by letting the free end of the arm ride in the channel slide track 6.

The several parts of the apparatus may be constructed of lighter weight by dividing the arm 1 into two members each disposed on a corresponding opposite side of the pole and each having its free end riding in either the same or a separate channel slide track 6, as shown.

The apparatus illustrated comprises a cradle 7 which is fixed to the pole 2 by any suitable means such as the chains 8 having chain tighteners 9 to effect a secure grasping of the pole. Since it is desired that cradle 7 be free of the ground when the pole drops into the hole, it is best to locate the forward end of cradle 7 facing the butt end of the hole a distance from the butt of the pole of about one foot greater than the depth of the hole.

The arm 1 is formed of two tie bars 10 and 11, one on each side of the cradle 7 and each having its forward end pivoted to the cradle by a pivotal connection 12 on pivot axis 3 which is shown as extending beneath the pole 2.

The hydraulic motor 4 comprises two long cylinders 13 each disposed in the forward open end of a push tube 14 extending rearwardly to the free end of tie bars 10 and 11, respectively. Each cylinder 13 has its piston 15 connected to cradle 7 by a piston rod 16 and pivotal trunnion 17, on an axis 18 parallel to axis 3 and spaced therefrom to provide the necessary leverage for actuation of the apparatus.

The rear end of tubes 14 are pivotally connected to the rear ends of the corresponding tie bars 10 and 11 by means of a transverse support axle 19. The rear ends of tie bars 10 and 11 are enlarged and provide slide shoes 20 which ride in the corresponding tracks 21 and 22. The tracks 21 and 22 are preferably of channel construction and lie flat on the ground to accommodate the necessary inward movement of the shoes 20 during raising of the pole. If desired, the tracks 21 and 22 may be joined together by suitable transverse braces 23.

The tubes 14 have a vertical slot 24 in each at the rear end portion to accommodate or receive the corresponding tie bars 10 and 11.

The hydraulic motor 4 comprised of the cylinders 13 and pistons 15 may be actuated by a suitable hydraulic pump 24 driven by a small engine 25. The pump 24 is connected to the cylinders 13 by suitable flexible pressure hoses 26 having a cross-over actuating valve 27 therein.

The apparatus is simple to assemble and disassemble for ready transport to and from location. It can be reduced to as many separate parts as may be desired by merely removing pivot shafts 12 and 19 and disconnecting the piston rods 16 from trunnions 17. The track 6 composed of channels 21 and 22 and cross braces 23 is a single unit for transport.

Various modes of carrying out the invention are contemplated as being within the scope of the following claims particularly pointing out and distinctly claiming the subject matter which is regarded as the invention.

I claim:

1. Apparatus for setting poles in the ground, comprising a support arm, means to pivot one end of said arm to the pole on a transverse axis with the free end of said arm supported on the ground and extending in a direction generally away from the butt end of the pole, power means interconnecting said arm and pole across said pivot axis and disposed to effect relative pivotal movement between said arm and pole with said arm tilting upwardly on its free end and the pole tilting upwardly on its butt end until the pole is substantially vertical, the butt end of the pole and said arm constituting the sole support for the pole during raising of the latter.

2. The apparatus of claim 1 in which said pivot means comprises a cradle adapted to be secured to the pole, and said support arm comprises at least one rigid brace on each side of said cradle and pivoted at one end thereto with the free ends of said braces adapted to extend toward the tip end of the pole, and said power means comprises an expandable link pivotally connected between each said arm and said cradle and means to expand said link to effect the tilting actions described.

3. The construction of claim 1 and track means freely supporting the free end of said support arm.

References Cited by the Examiner

UNITED STATES PATENTS

| 826,708 | 7/1906 | Brown | 214—3 |
| 1,339,082 | 5/1920 | Willis | 214—3 |
| 2,792,947 | 5/1957 | Weedman | 214—3 |

FOREIGN PATENTS

| 71,951 | 1/1951 | Denmark. |
| 595,966 | 12/1947 | Great Britain. |

GERALD M. FORLENZA, *Primary Examiner.*

MORRIS TEMIN, HUGO O. SCHULZ, *Examiners.*